United States Patent [19]

Kellberg et al.

[11] 4,205,660
[45] Jun. 3, 1980

[54] SOLAR ENERGY COLLECTOR

[75] Inventors: Howard E. Kellberg; Arthur H. Wilder, both of Corning, N.Y.

[73] Assignee: Corning Glass Works, Corning, N.Y.

[21] Appl. No.: 884,895

[22] Filed: Mar. 9, 1978

[51] Int. Cl.$^2$ .............................................. F24J 3/02
[52] U.S. Cl. .................................... 126/442; 126/450
[58] Field of Search ............... 126/270, 271, 432, 442, 126/450, 448

[56] References Cited

U.S. PATENT DOCUMENTS

| 1,801,710 | 4/1931 | Abbot | 126/271 |
| 4,091,793 | 5/1978 | Hermann et al. | 126/271 |
| 4,094,301 | 6/1978 | Sorenson et al. | 126/271 |
| 4,116,225 | 9/1978 | Ortabasi | 126/271 |
| 4,142,511 | 3/1979 | Doughty et al. | 126/271 |
| 4,144,875 | 3/1979 | Bruno | 126/271 |
| 4,147,156 | 4/1979 | Hopper | 126/271 |

Primary Examiner—Carroll B. Dority, Jr.
Attorney, Agent, or Firm—John P. DeLuca; Burton R. Turner

[57] ABSTRACT

A solar energy collector structure has been provided which comprises a plurality of at least partially evacuated tubular members arranged in a group and closely packed in parallel axial alignment. The tubular members are joined together to form a tube sheet. A unitary insulating support structure having a recess therein is adapted to receive the tube sheet in tandem therewith, the tube sheet being sealed within the recess of the support structure along respective opposite lateral margins thereof to form a flow channel therebetween. The support structure has headers integrally formed therewith and includes means for providing flow communication with the flow channel. An absorber, disposed behind the tube sheet, in communication with the flow channel, intercepts and absorbs solar energy, which by heat transfer is carried off by a working fluid in heat exchange relation with the absorber.

13 Claims, 16 Drawing Figures

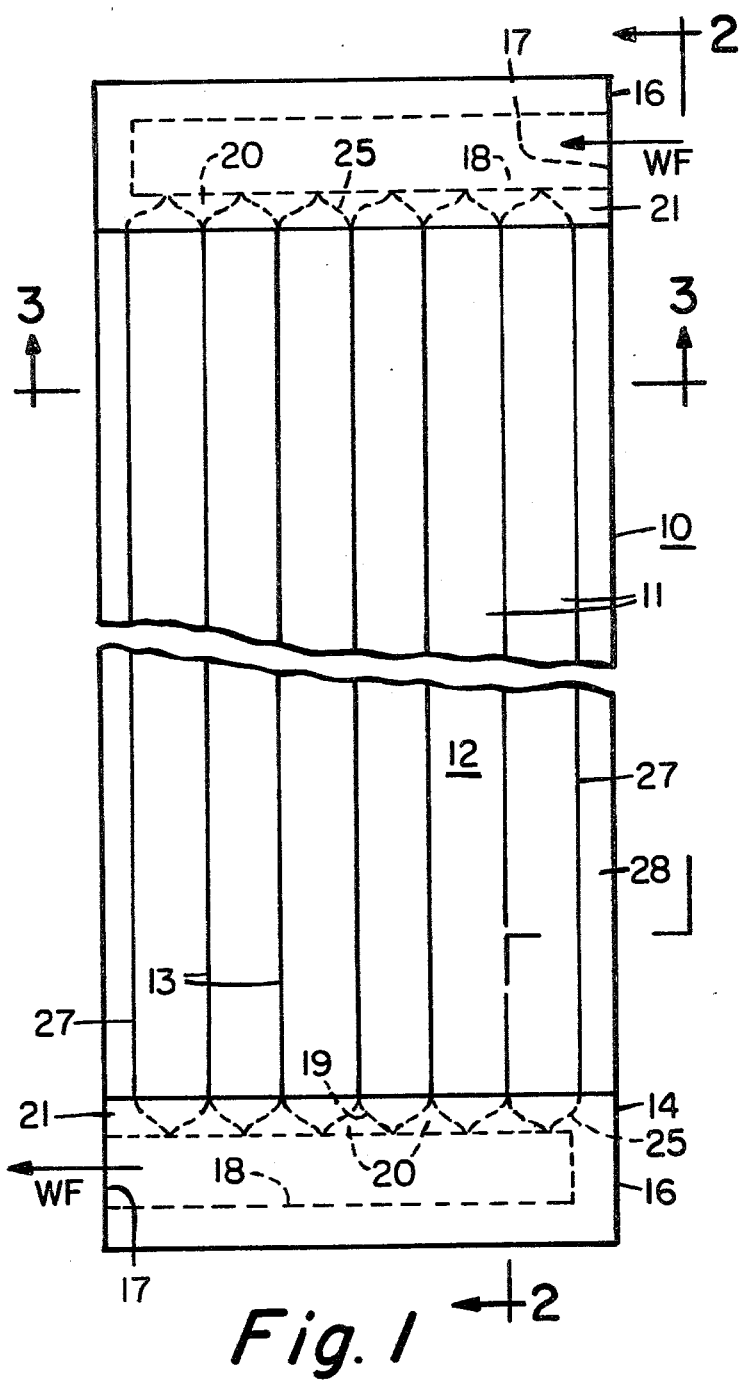
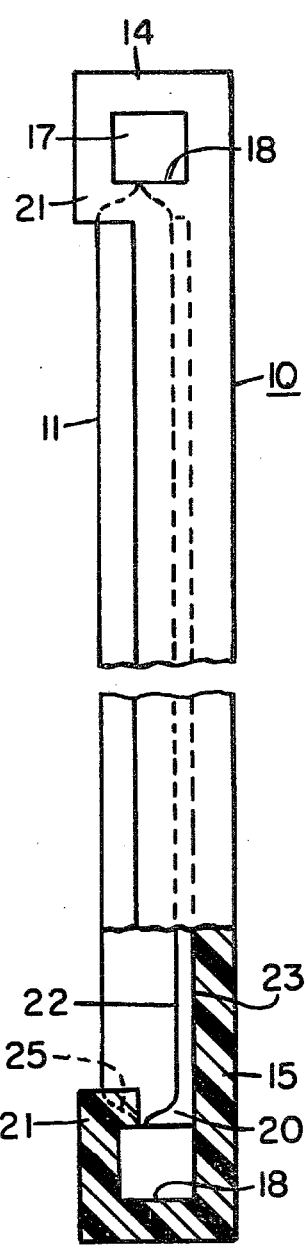
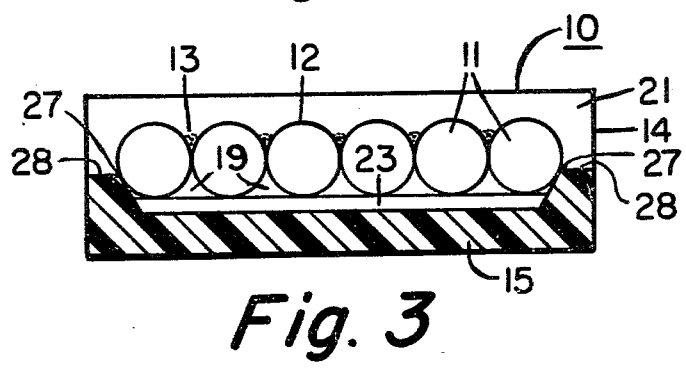
Fig. 1
Fig. 2
Fig. 3

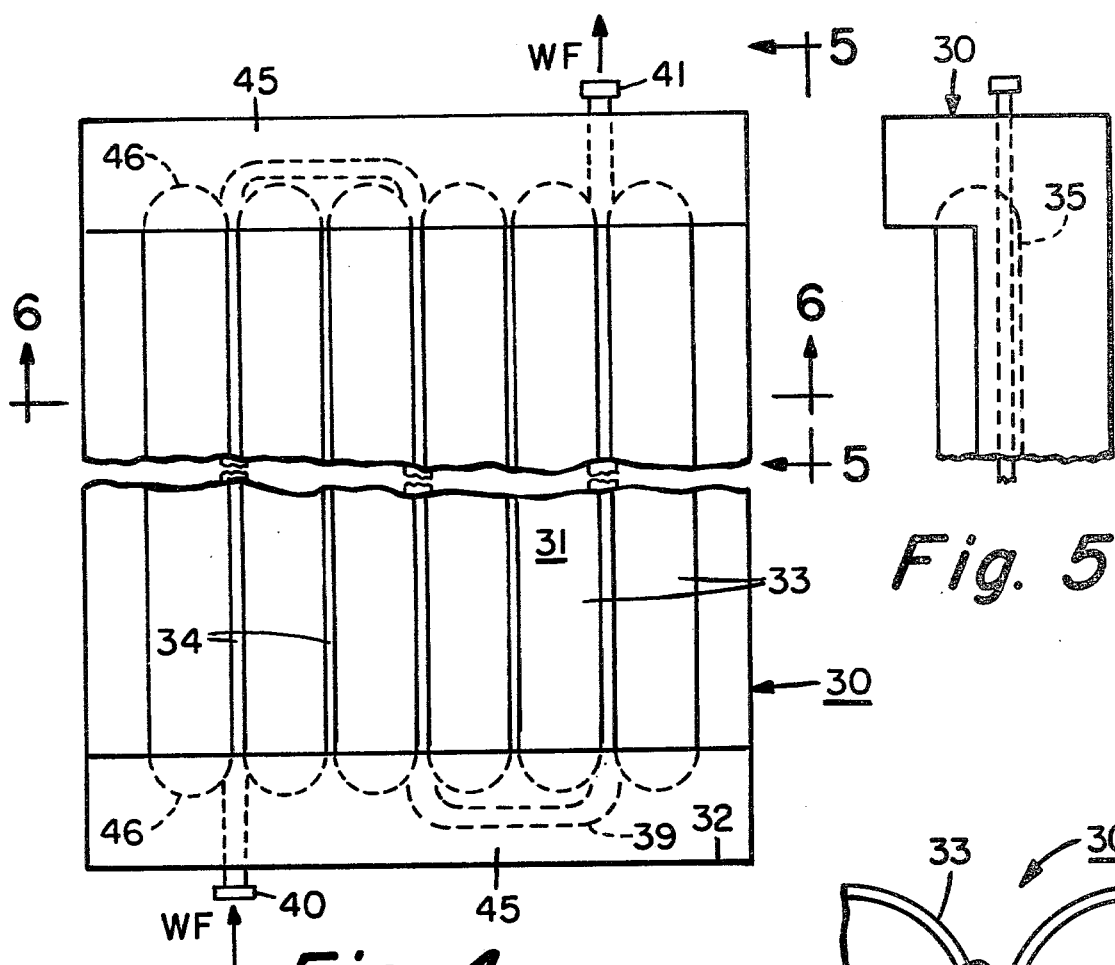
Fig. 4
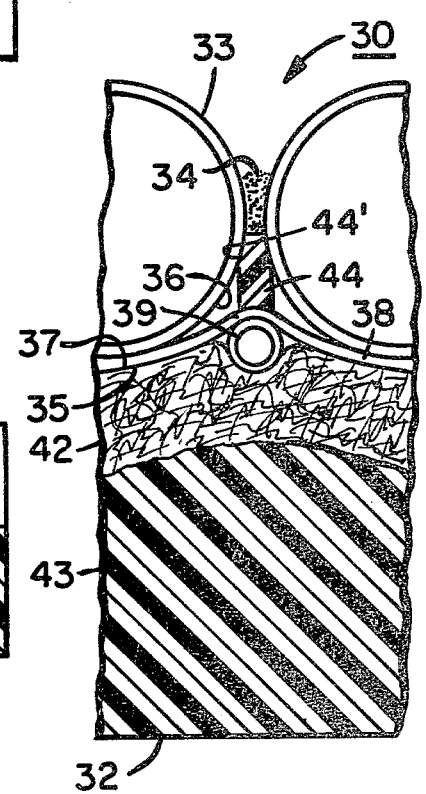
Fig. 5
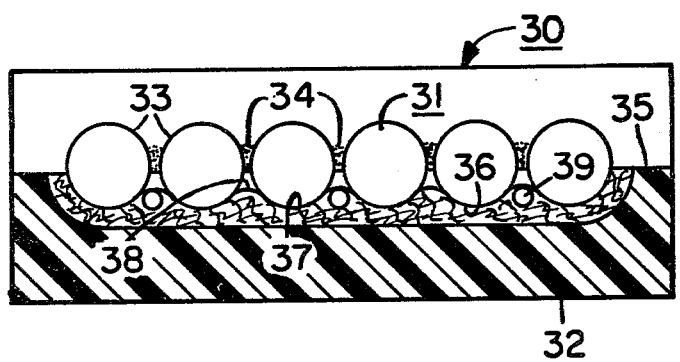
Fig. 6
Fig. 6a

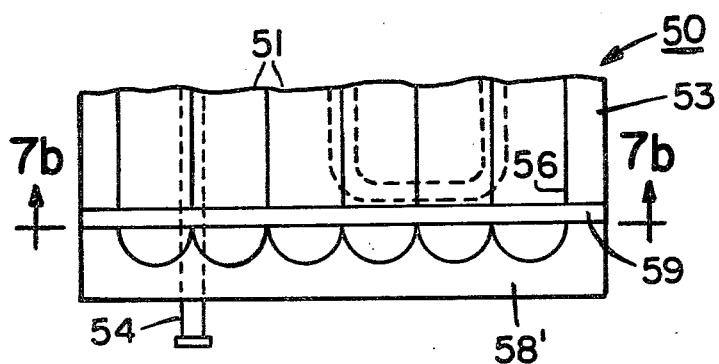
Fig. 7a
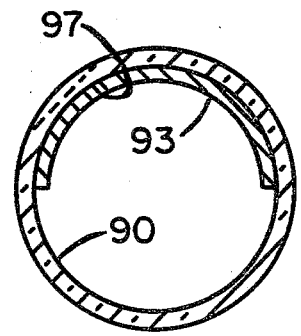
Fig. 9a
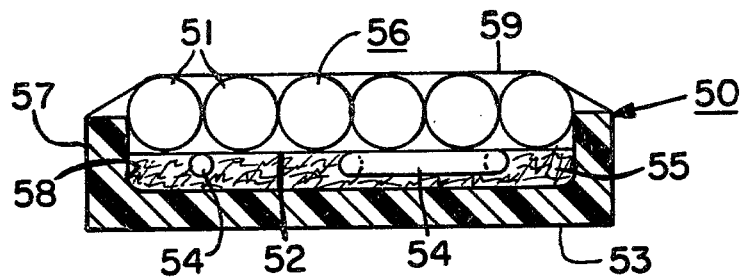
Fig. 7b
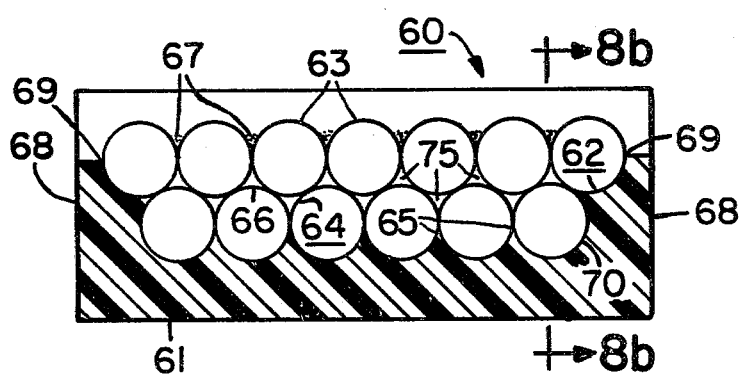
Fig. 8a
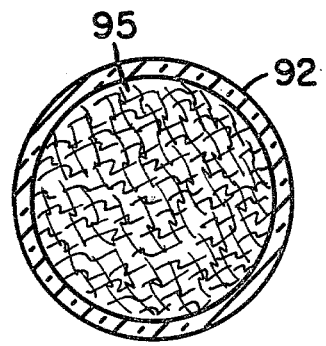
Fig. 9b
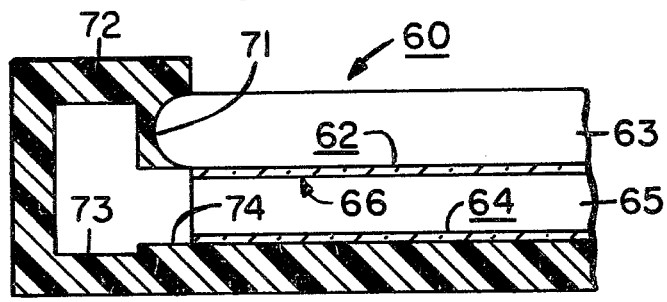
Fig. 8b
Fig. 9c

SOLAR ENERGY COLLECTOR

BACKGROUND OF THE INVENTION

The present invention relates to apparatus adapted for the collection of solar radiation and particularly relates to nontracking, "flat plate" type devices.

A typical flat plate solar collector of the prior art consists generally of a box-like structure having an upper side, insulated back and side members and a single or double pane window or cover sheet (usually glass) adapted to cover the open side of the box. A black absorber of some appropriate material is disposed within the structure for absorbing incident solar radiation which is admitted through the window. Inlets and outlets are provided for passing working fluid in heat exchange relation with the black absorber surface for removing sensible heat therefrom. The heated working fluid may be thereafter utilized in any number of different heating and storage arrangements.

In a typical collector of the prior art, the black absorber may be a sheet of material, usually metal, which is painted black or otherwise treated with appropriate materials to render the surface highly absorbent to incident radiation. The absorber surface may be one of the selective types, which exhibits a high absorptivity $\alpha$ (low reflectance) characteristic to incident visible radiation and has reasonably low emissivity $\epsilon$ (high reflectance) for infrared radiation, so that a high percentage of incident solar radiation is absorbed with low re-radiation of thermal infrared to the ambience.

A typical window, (a double pane arrangement of clear glass or plastic with an air space therebetween) provides some insulation from the ambience. By its nature, however, such a window has an upper limit of efficiency, due to residual convection loss caused by circulating air between the panes, conduction through the air and glass, and radiation from the absorber. The efficiency of such flat plate collectors would be enhanced further by evacuation of the air space between the panes. Conventional flat plate collectors with large cover sheets of glass do not lend themselves to evacuation due to the inherent weakness in glass strength caused by tensile stress produced when subjected to a vacuum on one side only.

One way to avoid this strength problem is to use a cylindrically shaped glass envelope to maintain vacuum around an absorber disposed therein. Because glass is strong under compression and due to the compressive nature of such stresses, glass tubing, even with very thin walls, can constitute an ideal structure for an evacuated collector. While plastic might be used, problems of window collapse, outgassing, and water diffusion limit the effectiveness of plastic, most probably to tubular arrangements with low quality vacuum.

In a typical evacuated collector of the type just described, an absorber surface gives up heat to a working fluid passing in heat exchange relation with the absorber. The working fluid may be passed through a U-tube attached to the absorber and connected to a manifold through the tube walls. Such an arrangement, while highly efficient, is costly, since high quality vacuum and glass-to-metal seals are expensive to produce and maintain. Furthermore metal components (usually copper or aluminum) are fabricated from strategic and energy intensive materials.

Another type of collector uses a concentric double wall vacuum bottle as a window. The internal concentric wall of the bottle acts as an absorber, or alternatively an absorber plate is a concentric metal element sleeved within the bottle. Working fluid is passed in heat exchange relation with the absorber in either open or closed circuit relation. Such systems, while effective, suffer from high cost, problems with manifolding, and do not lend themselves to high speed manufacturing technology.

In a closed circuit system, tubes or conduits, in intimate contact with the absorber surface, carry the working fluid (usually liquid). In an open system, working fluid may be trickled over the absorber surface in an open channel or direct contact arrangement. Such structures must be sealed in order to weatherproof and/or maintain vacuum of the system for proper functioning. Furthermore, if a closed system with liquid working fluid is utilized, the fluid must be chosen to reduce the possibility of freezing when the system is not in use (e.g. nights and cold cloudy days), or boiling leading to overpressure when the heat is not being used.

While, the climatic factors of the environment where the collector is to be used, the fuel type to be replaced by the collector and the energy load characteristics (e.g. hot water, heating, cooling) are important considerations when evaluating the design of a solar collector, by far the most important feature to consider is the solar system cost and the solar system performance. If the cost is too high for a given performance level, the solar collector will not become competitive with conventional fuels. Notwithstanding the fact that the future use of conventional fossil fuels is limited, with most recent estimates projecting an exhaustion of known reserves of oil and natural gas within this century, a solar collector having high system performance and relatively low cost must be produced before such systems will become viable alternatives to diminishing conventional fuel supplies. In addition, since nuclear energy sources and coal reserves exist in sufficient quantities to provide the necessary space heating energy requirements for the foreseeable future, a solar collector must compete with these available sources, notwithstanding the fact that the projected cost per BTU of these fuels will probably double or even triple in the near future. For a solar system to be competitive, cost must be sufficiently reduced to provide incentive for its use.

In addition to the foregoing, it is necessary that the amount and cost of materials required for the construction of an efficient solar collector be reduced to a minimum, since relatively large areas of collector surface are necessary to capture the heat sufficient to condition the spaces contemplated. For example, the classical double pane-flat plate collector requires in the order of 3-5 pounds of glass, 2 pounds of copper or other absorber material and about 2-3 pounds of insulation, framing, and encapsulation materials, plus sealants, for each square foot of absorber surface. Consequently if solar collector devices are to become a viable alternative, the material requirements must be substantially reduced, not only because the cost effectiveness will increase, but also because, in the long view, strategic and energy intensive materials such as copper and aluminum should be conserved.

The discussion herein is in terms of cost and performance of the collector based upon square footage of absorber area. In certain cases the total collector structure cost per square foot (insulation, absorber, plumbing, and glazing), is high relative to effective absorber area. In the latter case the structure area is the basis for cost or performance calculations. If, as contemplated in the present invention, the major portion of the collector structure is functionally equivalent to absorber area, the former basis is a valid criteria.

It is important to realize that, every area exerts different constraints on the solar system performance requirements. Total sunlight, average ambient atmosphere (e.g., degree days), percent of heating requirements offset by the solar system, and the length of the heating and cooling seasons, are basic parameters for calculating such variables as total collector surface necessary and the type and volume of storage required, which is compatible therewith. Further, each dwelling or structure requires individualized attention to particular constraints, e.g. the number of windows, exposure, type and quality of insulation, style of dwelling, etc. In this connection, it is important to note that, as the collector structure becomes more complex the manufacturing and materials cost become more difficult to reduce.

The solar collector of the present invention is designed to obviate many of the disadvantages and limitations of the described prior arrangements by providing a simplified structure exhibiting increased efficiency in performance and minimized cost in fabrication, combined with high speed production rates.

SUMMARY OF THE INVENTION

There has been provided a solar collector structure comprising a plurality of at least partially evacuated tubular members substantially transparent to incident solar radiation, said tubular members being arranged in a group and closely packed in parallel axial alignment, and means for joining the tubular members next to each adjacent tubular member of the group to form a tube sheet. The tube sheet is arranged to lie in tandem with a unitary insulating support structure having a recess therein which is adapted to receive the tube sheet in a back-to-back configuration. The tube sheet acts as an insulating solar window, while the support structure acts as backing insulation and frame. In a preferred embodiment, means is provided for sealing opposite lateral margins of the tube sheet with the support structure so as to provide at least one flow channel therebetween, and an absorber is disposed behind the tube sheet in communication with the flow channel for intercepting and absorbing solar radiation impinging thereon.

DESCRIPTION OF THE DRAWINGS

FIG. 1 is a top plan view of a solar collector constructed in accordance with the principles of the present invention.

FIG. 2 is a side cross section taken along line 2—2 of FIG. 1.

FIG. 3 is an end cross section taken along line 3—3 of FIG. 1.

FIG. 4 is a top plan view, similar to FIG. 1, of an alternative embodiment of the solar collector of the present invention, illustrating an alternative flow channel arrangement.

FIG. 5 is a fragmental side view taken along line 5—5 of FIG. 4.

FIG. 6 is an end cross section taken along line 6—6 of FIG. 4.

FIG. 6a is a fragmented detail of a portion of the end view of FIG. 6.

FIGS. 7a and 7b are schematic diagrams in respective fragmented top and end sections similar to FIGS. 4–6a but showing portions of another embodiment of the solar collector of the present invention.

FIGS. 8a and 8b are schematic diagrams in respective end and fragmental side sections similar to FIGS. 1-3 showing another embodiment of the solar collector constructed in accordance with the principles of the present invention, wherein a second row of tubular members form a flow channel and absorber support structure.

FIGS. 9a, 9b and 9c illustrate in end cross section various embodiments of the absorber and support therefor from FIGS. 8a and 8b.

Figure 10A:
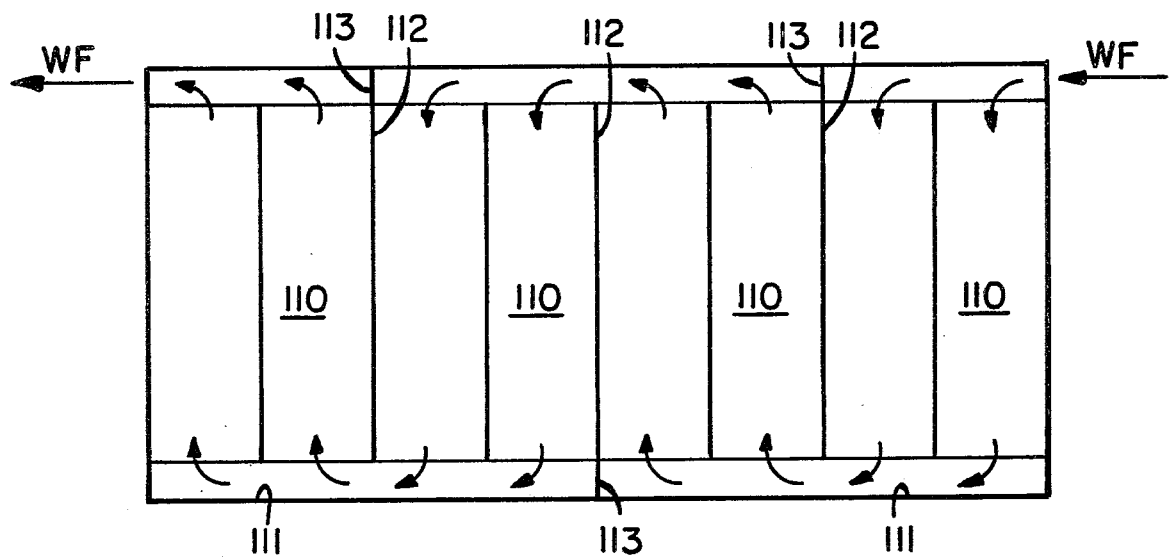
FIGS. 10a and 10b are respectively a schematic illustration of a possible header arrangement and a detail for a coupling arrangement for a plurality of collectors.

In certain drawings section lines for walls are omitted for clarity.

DESCRIPTION OF THE PREFERRED EMBODIMENTS

In FIGS. 1, 2 and 3 there is illustrated a solar collector 10, wherein a plurality, or group, of tubular members 11 are arranged in parallel axial alignment and formed into a tube sheet 12. Each of the tubular members or tubes 11 may be attached by some appropriate sealing means to its adjacent tube 11 along connecting seams or junctures 13. Sealing could be accomplished by employing a flexible silicone sealer, such as silastic, in a bead along each seam 13. While in the preferred embodiment the tube sheets 12 are formed from glass tubes, other structures could be formed by various known methods and from other materials.

Each of the tubes 11 may be partially evacuated to a selected partial pressure. However, a high vacuum of about $10^{-4}$ to $10^{-6}$ Torr is preferred for most effective results. A frame or support structure 14 is an integrally formed monolith of relatively rigid foam-like material which forms a support for the tubes 11 and other structures associated with the solar collector 10. The support structure 14 includes a base portion 15 having upstanding lateral walls 28 and header portions 16. Each header 16 is formed with an opening 17, a channel 18, and is in communication with a flow channel 19 for the collector 10 through transverse openings 20 formed in opposed interior walls 21 of the header portion 16. An absorber 22 is disposed rearward of the tube sheet 12 on an interior front facing surface 23 of base portion 15. The absorber 22 may be a metal foil having a highly absorbent coating deposited thereon. The tube sheet 12 is arranged so that transverse ends 25 mate with transverse openings 20 in headers 16, and likewise lateral ends 27 of tube sheet 12 are sealed along upstanding lateral walls 28 of base member 15.

In FIGS. 1–3 the flow of a working fluid, illustrated by arrows labeled WF, is traced from opening 17 in the upper portion of the drawing, left through channel 18, through transverse openings 20 in header wall 21, into flow channel 19, and thence through openings 20 in the header wall 21 in the lower part of the drawing, thereafter through channel 18 and out opening 17. It should be understood that, the higher the quality of vacuum within the tubes 11, the better insulation, since a greatly reduced atmosphere will reduce the possibility of convection and conductive heat transfer from the tubes 11.

FIGS. 4, 5 and 6–6c illustrate an alternative arrangement, wherein a collector 30 including tube sheet 31 and support member 32 are illustrated. Tube sheet 31 is formed from groups of respective tubular members or tubes 33 joined along seams 34 by sealing compounds or other appropriate means. Tubes 33 are arranged so that they lie in a recess 35 in support member 32. The arrangement is similar to that of FIG. 1, except that the collector 30 is primarily adapted for liquid working fluid whereas in the arrangement of FIG. 1 a gaseous working fluid is preferable. The recess 35 in support member 32 is formed to conform with inward facing surface 36 of tube sheet 31.

Forward facing surface 37 of support member 32 supports an absorber 38 which is in thermal contact with flow tube 39 which tube is arranged to carry working fluid WF therethrough from inlet end 40 to outlet end 41. The flow tube 39 follows a serpentine pattern as illustrated and receives thermal energy by conduction from the absorber 38. Interstices between tubes 33 are occupied by insulating material 42, disposed over a foamed portion 43 of support member 32 and in certain interstices flow tube 39 occupies some space as illustrated. End portion 45 encapsulates the opposite ends 46 of the tube sheet 31 and portions of the flow tube 39 located beyond those ends 46.

In FIG. 6a a detail of the support member 32 and tube sheet 31 near an interstice is illustrated. Insulating member or spacer 44 cushions tubes 33 one from the other and may space them slightly apart. Insulating member 44 conforms by upper side surfaces 44' to the tube 33 surface as illustrated, and prevents thermal leaks by occupying space between the tubes and reducing convection in that region. The forward facing surface 37 of the recess 35 conforms to the shape of the inward facing surface 36 of the tube sheet 31 so as to further reduce convection loss.

FIGS. 7a-7b illustrate in respective fragmented top and end sections a collector 50 similar to the one shown in FIGS. 1-3. In this arrangement tubes 51 are disposed over a relatively flat absorber 52 disposed within recess 58 of base member 53. The absorber 52 has flow tube 54 attached in thermal contact therewith and which tube 54 is encapsulated in insulating material 55. The tubes 51 forming tube sheet 56 are evacuated and are retained in the recess 58 by side walls 57 opposite end walls 58' and strap 59 which surrounds the collector 50 near its opposite walls 58' (only one end of which is shown in the fragmented top view of FIG. 7a).

FIGS. 8a and 8b illustrate in respective end and fragmented side sections another embodiment of a collector of the present invention wherein collector 60 is formed with a support member 61, and tube sheet 62 produced in a manner similar to that described above for other embodiments herein. Tubes 63 of the tube sheet 62 are evacuated and are disposed over an absorber support structure 64 including open ended tubes 65 having an interior forward facing surface 66 coated with an absorber material. The evacuated tubes 63 are secured together by sealing at seams 67. Tube sheet 62 is encapsulated in the recess 70 of support member 61 along upstanding lateral side walls 68 of tube sheet 62 at lateral margins 69 and along opposed ends 71 thereof at header portions 72. The header portions 72 are integral with base portion 61 and include passages 73 suitably moulded or foamed in place, which passages 73 are in communication with open ended tubes 65 via channels 74. Working fluid flows similarly as in the collector 10 of FIG. 1 with the exception that working fluid flows through open ended tubes 65 instead of interstices 75 for the tubes 63. In the embodiment of FIGS. 8a-b interstices 75 form a relatively small dead air space over forward facing surface 66, such that convection losses are reduced.

FIGS. 9a, 9b and 9c illustrate variations in the absorber support structure 64 of FIGS. 8a and b. Respective tubular members 90, 91 and 92 each support an absorber 93-94-95. In FIG. 9a tubular member or tube 90 has its inner forward facing surface 97 treated with absorber 93 which may be black paint or other suitable coating. The tube 91 of FIG. 9b supports a light weight opaque metal absorber 94 in a spring loaded fashion between edge portions 96. The absorber 94 is also suitably coated. Tubular member 92 in FIG. 9C has blackened, shreaded low density fibrous wool-like material 95 interior thereof, which acts both as an absorber and as a source of interference to flow of working fluid flowing therethrough for better heat exchange. The material 95 may be continuous filament fiber glass having a density of between about 0.045 to about 0.070 gm/cm$^3$. Such materials are often used in domestic and industrial hot air heating and cooling systems for filtering coarse particulates from the air stream. Variations in the absorber support are many and the general examples shown herein are exemplary.

In FIG. 10a and b collectors 110 which may be any of the gaseous flow types described herein are illustrated schematically. As illustrated they are arranged in series by joining lateral ends 112 of each header portion 111 in adjacent juxtaposition with respective knock out elements 113 of the header portions 111 in place or removed to establish a desired flow path.

Figure 10B:
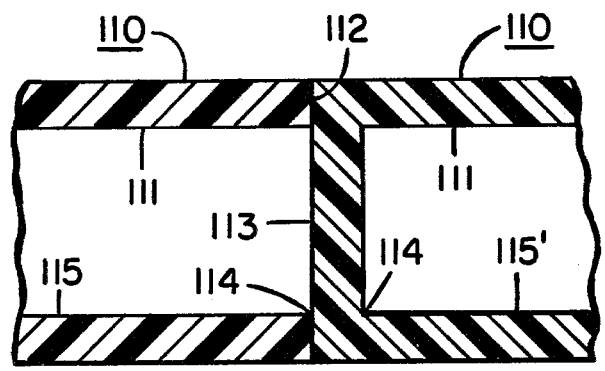

FIG. 10b illustrates a detail of knock out element 113 which is removable from ends 114 of header portion 111 so as to communicate channel 115 of one collector 110 (on the left) with that channel 115' of the up stream (right hand) collector 110. With elements 113 placed as shown in FIG. 10a in respective alternative upper and lower header portions 111 of collectors 110 the flow is serial from one collector or the next (see arrows referred as WF). By varying the location of the elements 113 various flow patterns may be established.

While there has been described what are considered to be preferred embodiments of the present invention, it will be readily apparent to those skilled in the art, that various changes and modifications may be made therein without departing from the invention, and is intended, in the appended claims, to cover all such changes and modifications, as fall within the true spirit and scope of the invention.

We claim:
1. A solar energy collector structure comprising:
  a plurality of partially evacuated tubular members substantially transparent to incident solar radiation, said tubular members having opposed lateral ends, being arranged in a group and lying adjacent one another in parallel axial alignment; means for joining each tubular member next to each adjacent tubular member of the group to form a tube sheet structure;
  a unitary insulating support structure including opposed header means and an integral base member joining one to the other, said support structure having a recess in the base member adapted to receive the tube sheet therein, the tube sheet being sealed in the recess along opposed lateral ends, said tube sheet and support structure arranged adjacent each other in the tandem to form at least one flow channel therebetween, the header means engaging with opposite free ends of the tube sheet for providing inlet and outlet passages in communication with said flow channel, the base member being located adjacent the tube sheet for defining with the tube sheet opposed boundary surfaces for the flow channel, and an absorber disposed in communication with said flow channel for intercepting and absorbing solar energy.

2. The solar energy collector of claim 1 wherein said absorber surface comprises an absorptive film deposited on a selected operative surface of said flow channel.

3. The solar energy collector of claim 1, wherein said absorber surface comprises: an absorptive metallic foil disposed in said flow channel behind said tube sheet.

4. The solar collector of claim 1, further includes: an insulating means behind said absorber means for blocking radiation of energy from said absorber means in a direction out of the interior of the flow channel.

5. The solar collector of claim 1, wherein said collector is adapted to receive a working fluid into and out of said flow channel in heat exchange relation with said absorber surface.

6. The solar collector of claim 1, wherein said tube sheet and base member are arranged in intimate contact and intersticies between the adjacent tubular members form flow channels.

7. The solar energy collector of claim 1, wherein said partially evacuated tubular members are evacuated to a partial pressure ranging from about 350 Torr to about $10^{-6}$ Torr.

8. The solar energy collector of claim 1, wherein said absorber surface includes: a coating exhibiting selective absorptive and emissive properties such that in an energy range corresponding to incident solar radiation, absorption of said energy is relatively high and in an energy range corresponding to infrared energy, emission by radiation is relatively low.

9. The solar energy collector of claim 1, wherein said header means comprises: a unitary body of insulating material for each of the opposite transverse free ends of the tube sheet, having at least one transverse opening therein, adapted to mate with corresponding transverse free ends of the tube sheet, which transverse opening connects with the flow channel between the tube sheets and the absorber.

10. The solar energy collector of claim 9, wherein working fluid flows in heat exchange relation with the absorber in said flow channel, and said header means has a channel opening in communication with the transverse opening for providing a flow path through said header for the working fluid, said channel opening being a corresponding inlet and outlet as determined by flow direction of said working fluid therethrough.

11. The solar energy collector of claim 10, wherein the channel opening of the header is longitudinal with said header and is adapted and mated with similar channel openings of adjacent collector structures for forming a bank of collectors.

12. The solar energy collector of claim 1, further including means for joining lateral free ends of the tube sheet to respective lateral margins of the base member.

13. The solar energy collector of claim 12 wherein the base member further comprises: an upstanding marginal side support member for each lateral margin of the base member for retaining the tube sheet and being bonded in lateral contact with and extending laterally from one transverse free end of the tube sheet to the other.

* * * * *